United States Patent
Sinha et al.

(10) Patent No.: US 8,561,029 B2
(45) Date of Patent: Oct. 15, 2013

(54) PRECISE THREAD-MODULAR SUMMARIZATION OF CONCURRENT PROGRAMS

(75) Inventors: Nishant Sinha, Plainsboro, NJ (US); Chao Wang, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 333 days.

(21) Appl. No.: 12/894,710

(22) Filed: Sep. 30, 2010

(65) Prior Publication Data

US 2011/0078511 A1 Mar. 31, 2011

Related U.S. Application Data

(60) Provisional application No. 61/247,247, filed on Sep. 30, 2009.

(51) Int. Cl.
*G06F 9/44* (2006.01)
*G06F 11/00* (2006.01)

(52) U.S. Cl.
USPC .......................... 717/126; 717/124; 714/38.1

(58) Field of Classification Search
USPC .............................. 717/124–135; 714/37, 38.1
See application file for complete search history.

(56) References Cited

U.S. PATENT DOCUMENTS

| | | | |
|---|---|---|---|
| 7,784,035 B2 * | 8/2010 | Kahlon et al. | 717/133 |
| 7,844,953 B2 * | 11/2010 | Morizawa et al. | 717/126 |
| 8,380,483 B2 * | 2/2013 | Kahlon | 703/22 |
| 8,448,145 B2 * | 5/2013 | Ganai et al. | 717/126 |
| 2006/0059094 A1 * | 3/2006 | Oh et al. | 705/51 |
| 2006/0155905 A1 * | 7/2006 | Leino et al. | 710/243 |
| 2007/0011671 A1 * | 1/2007 | Kahlon et al. | 717/170 |
| 2007/0022325 A1 * | 1/2007 | Morizawa et al. | 714/38 |
| 2007/0143742 A1 * | 6/2007 | Kahlon et al. | 717/124 |
| 2008/0086723 A1 * | 4/2008 | Kahlon | 717/132 |
| 2009/0089783 A1 * | 4/2009 | Wang et al. | 718/100 |
| 2009/0204968 A1 * | 8/2009 | Kahlon et al. | 718/100 |
| 2009/0327997 A1 * | 12/2009 | Gulwani et al. | 717/110 |
| 2010/0088680 A1 * | 4/2010 | Ganai et al. | 717/126 |

OTHER PUBLICATIONS

Reps et al., "Precise Interprocedural Dataflow Analysis via Graph Reachability," 1995, ACM, p. 49-61.*
Qadeer et al., "Summarizing Procedures in Concurrent Programs," Jan. 2004, ACM, p. 245-255.*
Chaki et al., "Concurrent software verification with states, events, and deadlocks," 2005, p. 461-483.*
de Moura et al., "Z3: An Efficient SMT Solver," 2008.*
Kahlon et al., "Static Data Race Detection for Concurrent Programs with Asynchronous Calls," Aug. 2009, ACM, p. 13-22.*
Chaki et al., "Concurrent software verification with states, events, and deadlocks," 2005, Formal Aspects of Computing, p. 461-483.*
Sinha, Nishant, "Symbolic Program Analysis using Term Rewriting and Generalization," 2008, IEEE, p. 1-9.*

(Continued)

*Primary Examiner* — Qing Chen
(74) *Attorney, Agent, or Firm* — Joseph Kolodka (57) ABSTRACT

Methods and systems for concurrent program verification. A concurrent program is summarized into a symbolic interference skeleton (IS) using data flow analysis. Sequential consistency constraints are enforced on read and write events in the IS. Error conditions are checked together with the IS using a processor.

18 Claims, 4 Drawing Sheets

(56) References Cited

OTHER PUBLICATIONS

Burckhardt, S. et al., "CheckFence: Checking Consistency of Concurrent Data Types on Relaxed Memory Models", Proceedings of the ACM SIGPLAN 2007 Conference on Programming Language Design and Implementation, San Diego, California, USA, Jun. 11-13, 2007, 10 pages.

Lal, A. et al., "Interprocedural Analysis of Concurrent Programs Under a Context Bound", Lecture Notes in Computer Science, Proceedings of the Theory and practice of software, 14th international conference on Tools and algorithms for the construction and analysis of systems, Budapest, Hungary, 2008, pp. 282-298.

Wang, C. et al., "Symbolic Predictive Analysis for Concurrent Programs", Lecture Notes in Computer Science; vol. 5850, Proceedings of the 2nd World Congress on Formal Methods, Eindhoven, The Netherlands, ISBN:978-3-642-05088-6, 2009, pp. 256-272.

Wang, C. et al., "Symbolic Pruning of Concurrent Program Executions", Amsterdam, The Netherlands, ACM 978-1-60558-001-2/09/08, Foundations of Software Engineering, Proceedings of the the 7th joint meeting of the European software engineering conference and the ACM SIGSOFT symposium on the foundations of software engineering, Aug. 23-28, 2009, pp. 23-32.

Lal, A. et al., "Reducing Concurrent Analysis Under a Context Bound to Sequential Analysis", Special Issue: 20th International Conference on Computer Aided Verification.

(CAV'08), Formal Methods in System Design, vol. 35, No. 1, DOI: 10.1007/s10703-009-0078-9, pp. 73-97. Aug. 2009.

\* cited by examiner

| Access | loc | val | Path cond |
|---|---|---|---|
| W1 | @x | 0 | true |
| R1 | @x | $r_1$ | true |
| R2 | @x | $r_2$ | $r_1 < 1$ |
| W2 | @x | $r_2 + 1$ | $r_1 < 1$ |
| R3 | @x | $r_3$ | $r_2 \geq 1$ |
| W3 | @x | $r_3 + 2$ | $r_2 \geq 1$ |
| R4 | @x | $r_4$ | true |

FIG. 4

```
main() {
    p = &a;
    q = &b;
    r = &c;
    q = p;
    q = r;
}
```

PRECISE THREAD-MODULAR SUMMARIZATION OF CONCURRENT PROGRAMS

RELATED APPLICATION INFORMATION

This application claims priority to provisional application Ser. No. 61/247,247 filed on Sep. 30, 2009, incorporated herein by reference.

BACKGROUND

1. Technical Field

The present invention relates to concurrent program verification and, in particular, to systems and methods for symbolically checking assertions in concurrent programs in a compositional manner.

2. Description of the Related Art

A variety of methods have been developed for checking properties of concurrent programs. Analyzing all thread interleavings is a bottleneck: all interleavings of global object accesses that may affect a property are be checked. Most methods for verifying concurrent software symbolically encode the transition relation of the program in terms of a first-order or propositional logic formula and use a satisfiability/satisfiability-modulo-theory (SAT/SMT) solver to find thread interleavings that violate the property.

Other approaches either (i) abstract the transition relations of individual threads and iteratively refine the abstractions based on counterexamples found, (ii) abstract and refine the set of reachable states of each thread, (iii) use assume-guarantee reasoning based on computing environment assumptions for each thread, or (iv) unroll the transition relation of the concurrent program in a context-bounded manner. Methods of type (i) are incomplete with respect to proving general assertions since they are not able to expose all of the relations between local states of threads. Methods of type (ii) have not been applied to real-life C programs and may suffer from large number of refinement iterations. Methods of type (iii) are extremely expensive due to the cost to computing environment assumptions automatically. Methods of type (iv) are context-bounded.

The task of searching through large number of interleavings, together with the complex data-flow in individual threads, over-burdens the constraint solver and thus impedes the scalability of the prior approaches.

SUMMARY

A method for concurrent program verification is shown that includes summarizing a concurrent program into a symbolic interference skeleton (IS) using data flow analysis, enforcing sequential consistency constraints on read and write events in the IS, and checking error conditions together with the IS using a processor.

A system for concurrent program verification is shown that includes a modular program verifier configured to accept an application and determine whether the application includes concurrency errors. The modular program verifier includes a program analysis module configured to summarizing the application into a symbolic interference skeleton (IS) using data flow analysis, a constraint enforcement module configured to enforce sequential consistency constraints on read and write events in the IS, and a processor configured to check error conditions together with the composed IS.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Data-flow analysis of concurrent programs may be used to construct symbolic thread-modular summaries called interference skeletons. These skeletons include read and write events that occur in the program, together with symbolic data flow equations between the events and their relative ordering. They serve as exact and compact abstractions of the transition relations of individual threads and may be used to greatly increase the efficiency of verifying the programs that they represent.

In order to check assertions, interference skeletons are composed by enforcing sequential consistency constraints between the programs' read and write events. Complex program constructs like pointers, structures and arrays can be handled by the present principles. Employing such summaries allows for significant improvements in verification speed.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
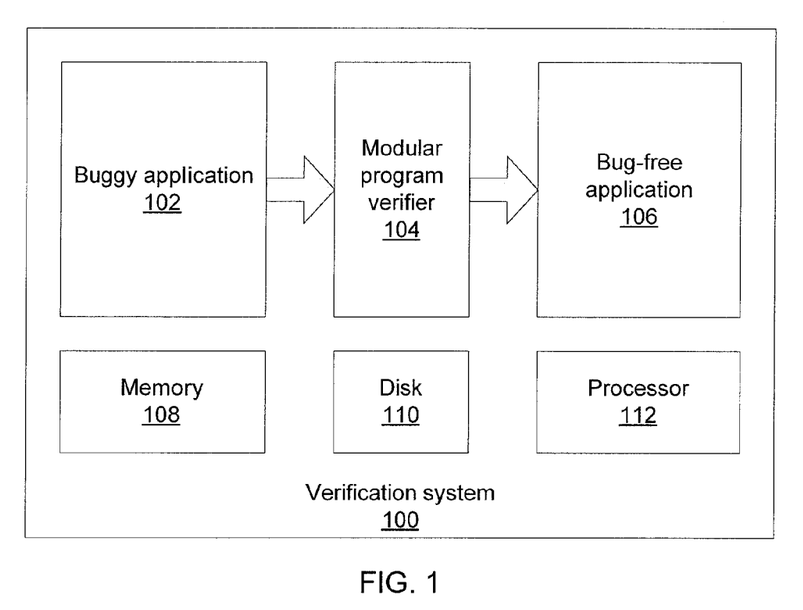
FIG. 1 is a block diagram of a program verification system.

Referring now to the drawings in which like numerals represent the same or similar elements and initially to FIG. 1, an abstract view of a system for implementing a program verifier according to the present principles is shown. Verification system 100 takes a buggy piece of software 102, applies a modular program verifier 104 to the buggy application and, in so doing, produces a bug-free application 106. The system includes memory 108 for holding the buggy application 102 while it is being verified, a disk 110 for storing the bug-free application 106 after it has been verified, and a processor for implementing the verification.

One technique to address the problem of verifying large concurrent systems is that of compositional minimization: one first creates an abstraction of each concurrent component and then composes the abstractions, thus reducing the complexity of the overall composition. The present principles advantageously provide a new compositional minimization technique for checking concurrent programs based on thread-modular summarization of transition relations of individual threads. Although it is contemplated that the present principles may be applied to any concurrent program, concurrent C programs are used herein for the purpose of example.

Computing a thread-modular summary is difficult due to interferences from other concurrent threads. This is because the value read from a shared memory location in a thread may not be the same as the previous value written to the location in the same thread. To compute these summaries precisely, interference abstraction may be used: all read accesses to shared memory locations (global reads) during summarization are abstracted by symbolic free variables. Interference abstraction allows the analysis to account for arbitrary writes from threads executing in parallel. Moreover, it allows the analysis to summarize the thread-local transition relation (including global writes) precisely in terms of the global reads performed by a given thread.

Figure 2:
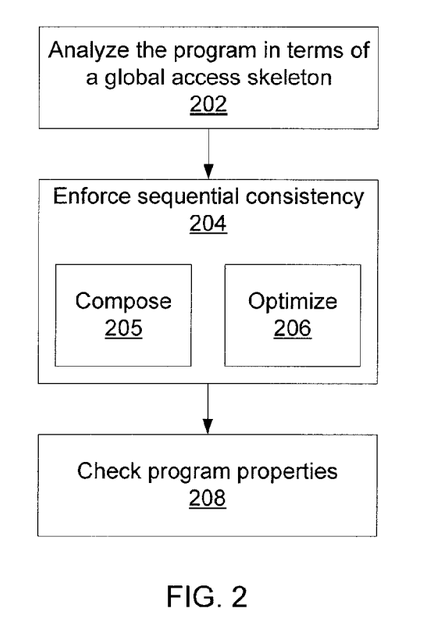
FIG. 2 is a block/flow diagram of a method/system for concurrent program verification that employs program summaries.

Referring now to FIG. 2, an overview of a method for compositional minimization is shown. Block 202 performs a symbolic, precise, thread-modular data-now analysis to summarize the whole program in terms of an interference skeleton (IS). This skeleton includes all read and write accesses that each thread performs with respect to shared memory locations, the data flow from read to write accesses, together with a partial order on the accesses. Composition refers to finding feasible paths of reads and writes in the interference skeleton, and is also referred to as linearizing the interference skeleton. The skeleton is then linearized at block 204, using a symbolic encoding, to obtain all the traces of the concurrent program by collapsing the partial order. To ensure that a linearization only contains concretely feasible traces, the encoding enforces an abstract sequential consistency (SC) criterion on the global accesses in the linearization. This enforces the sequential consistency of the reads and writes of the linearization and includes the steps of composing at block 205 and optimizing at block 206. Finally, block 208 checks the program properties using an off-the-shelf satisfiability-modulo-theory (SMT) solver by checking if there is a sequentially consistent linearization that satisfies a given error path condition.

Summarization allows for computing the value of each global read or write in terms of preceding accesses by the same thread. To summarize each thread, a precise data flow analysis is performed on the program control flow graph. The analysis is underapproximate in the sense that it analyzes only a subset of all feasible program paths. However, the data facts computed for the above subset are computed path-sensitively, leading to precise detection of errors.

Applying the above method to real-life C programs is not straightforward. First, there is complexity in terms of the variety of program constructs, e.g., pointers, arrays and structures. Precise modeling of indirect memory accesses during data flow analysis leads to complex nested symbolic values, which become a bottleneck for the SMT solver during the solving phase. According to the present principles, however, pointers and arrays constructs can be handled effectively in this framework. More precisely, the results of a scalable alias analysis are exploited to create a partitioned memory model for the data-flow analysis. This minimizes the alias conflicts during analysis and makes it more scalable. Moreover, the composition is optimized systematically, based on an analysis of the interference skeleton computed during summarization.

One characteristic of this approach is that abstraction, composition and optimization phases are independent. Separation of abstraction and composition phases allows one to perform systematic optimizations during composition, before the actual error check. Moreover, the size of the interference skeleton is much smaller than the size of the original program since the number of shared variable accesses is small compared to local accesses. Constructing this skeleton allows one to focus on the concurrent aspects of the verification problem without being distracted by the thread-local constraints. In effect, summarization allows one to compositionally reduce the problem of checking the concurrent programs to the problem of checking the sequential consistency of the global accesses.

Rather than employing a finite domain to ensure scalability and termination and performing eager composition during analysis by exploring all possible interleavings, the present principles use a precise data-flow analysis on program expressions to compute violations precisely. This approach can be also viewed as a generalization of symbolic execution methods to concurrent programs: instead of propagating data facts on individual paths (as in symbolic execution for sequential programs), the present principles merge data facts at the join locations in the program path-sensitively, thus avoiding path enumeration. Moreover, the analysis computes a thread modular summarization only, such that the actual composition is delayed to a later stage.

Most previous approaches pass on the complexity of the whole transition relation of each thread to the decision procedure. For example, an SMT solver must check for feasibility of traces in the composition. In contrast, data flow analysis constructs compact thread-local summaries in form of an interference skeleton. This skeleton is then composed in an efficient manner using SC constraints, which is finally presented to the SMT solver. Abstracting away the local control and data flow during summarization makes the global accesses explicit and optimized composition enables the decision procedure to focus on a central problem of concurrent program verification. i.e., finding an interleaving of the global accesses that violates a given assertion.

Concurrent programs can be represented as concurrent control flow graphs (CCFGs) that include fork and join nodes in addition to control flow nodes. It can be assumed that there is no unbounded thread creation, (i.e., that fork nodes do not occur inside a loop or recursive function) and that a finite unrolling of the control flow graph of each thread, such that loops and recursive functions are unwound to a finite depth. A memory location l is said to be shared if more than one thread can read from or write to l. A variable is said to be shared if it can access a shared memory location at some point during program execution. Accesses to shared memory locations are referred to herein as global accesses.

Each read and write access to the memory is labeled as a read or write access respectively. Each such access consists of a pair (loc,val), where loc denotes the memory location which it accesses, and val denotes the value read or written. Moreover, the location and values may be represented symbolically. A global access $e_1$ is said to interfere with another global access $e_2$ if loc($e_1$)=loc($e_2$) and one of them is a write access. Each access belongs to a particular thread whose identifier is denoted by tid(e).

Figure 3:
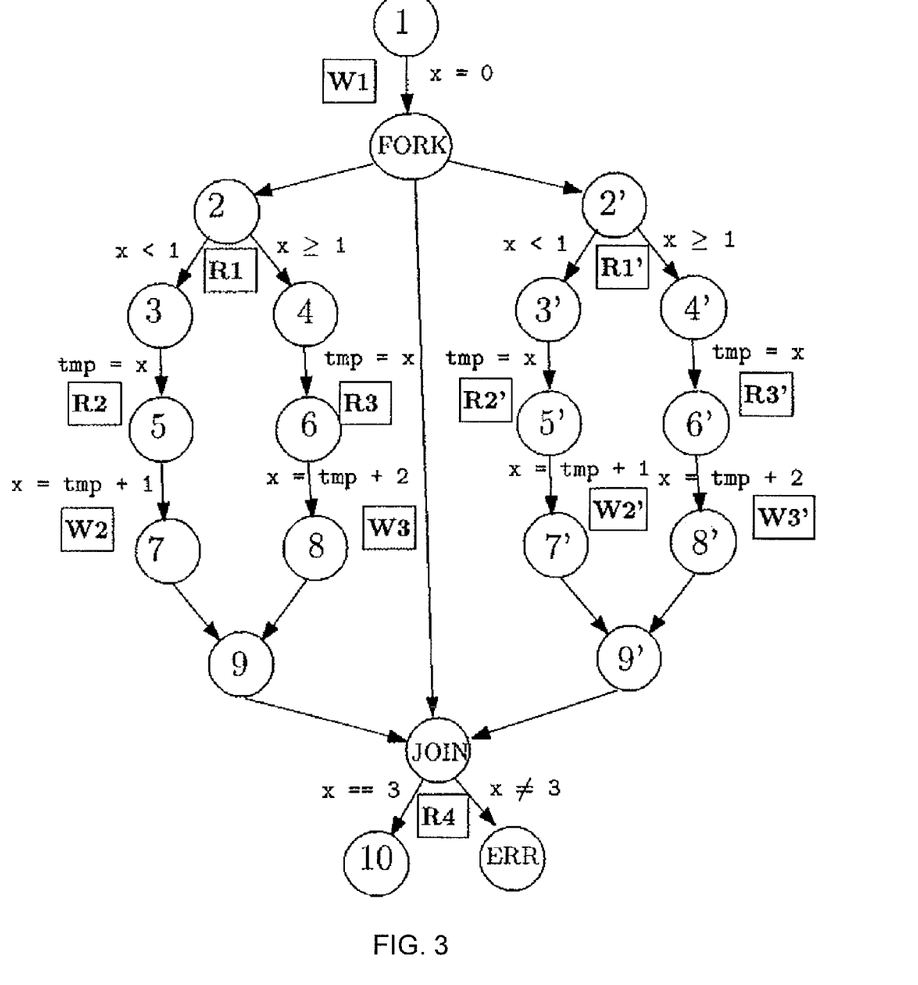
FIG. 3 is an exemplary concurrent control flog graph of a concurrent program.

The following is a simple multi-threaded C program using the Pthread library. Referring to FIG. 3, a CCFG is shown that corresponds to the below C program. The program contains a single shared variable x. Two threads are created from the main thread, which read and write x. In the CCFG, special nodes FORK and JOIN represent thread creation and termination points, respectively. The CCFG consists of sub-graphs for three threads, main (nodes: 1, FORK, Join, 10, ERR), $t_1$ (nodes: 2-9) and $t_2$ (nodes: 2'-9'). For brevity, multiple FORK and JOIN nodes have been merged into a single node. New assignments have been added to ensure that each statement makes exactly one read or write of a shared variable (global access).

```
int x;
void add_global ( ) {
    if (x<1) x=x+1;
    else x=x+2;
}
int main (int argc, char *Argv[ ]) {
    pthread_t t1, t2;
    x=0;
    pthread_create (&t1, NULL, NULL, add_global);
    pthread_create (&t2, NULL, NULL, add_global);
    pthread_join (t1);
    pthread_join (t2);
    assert (x==3);
}
```

FIG. 3 shows the CCFG with the global accesses marked: W1, W2, W3, W2', and W3' are the global writes, while R1, R2, R3, R1', R2', R3', and R4 are the global reads. First, data flow analysis is performed on the CCFG to compute an interference skeleton (IS), which summarizes the CCFG in terms of global accesses. The summary includes computing the values of the global writes in terms of previous global reads, together with the path conditions for each global write. Moreover, the relative order of the global accesses is computed. Performing precise thread-modular analysis allows one to assign a non-deterministic value (a fresh symbolic variable) to each global read. Each global read or write access e is represented using a (loc,val) pair during analysis, where loc (e) and val(e) correspond to the memory location and the value that is read/written during the access e.

Figure 4:
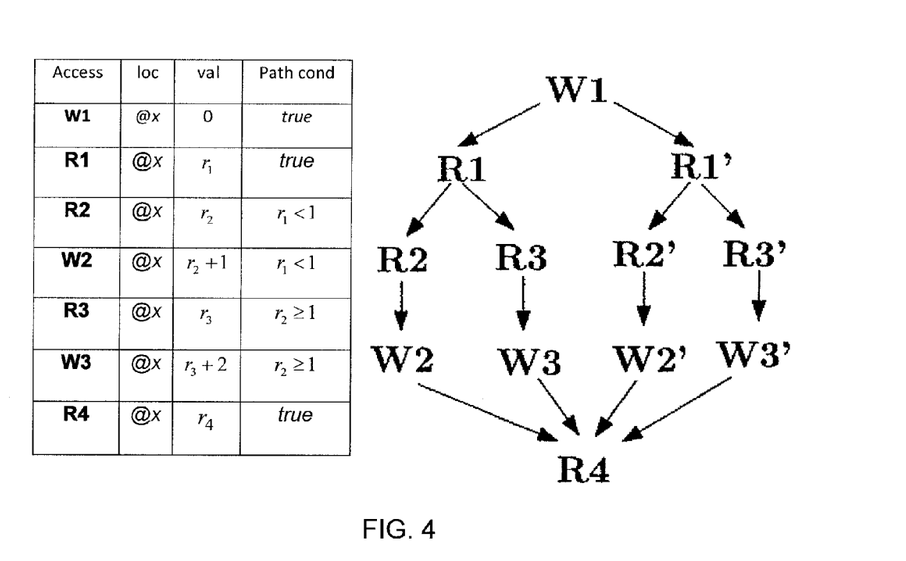
FIG. 4 shows the value and the path conditions for a subset of global accesses in the CCFG of FIG. 3.

Referring now to FIG. 4, the location, value and the path conditions for a subset of global accesses in the CCFG is shown. This figure represents the IS for the CCFG shown in FIG. 3. The accesses R1, R2, R3 are assigned symbolic values $r_1$, $r_2$, $r_3$ and the write accesses assume values based on them. Note that even though R1 and R2 are consecutive accesses to x, they are assigned different symbolic values $r_1$ and $r_2$. This means the interference from other threads may be taken into account when the interference skeletons are composed. The analysis collects the path conditions under which these accesses happen, e.g., W2 occurs under the condition $r_1$<1, which in turn depends on R1 access. At the intra-thread join point 9 in FIG. 3, the path conditions $r_1$<1 and $r_1 \geq 1$ are merged to obtain true. The analysis also propagates the local states and merges them path-sensitively at the intra-thread join points, using the if-then-else operator (details below). At the inter-thread join point (JOIN), the path conditions are conjuncted to ensure that all the threads reach the join point. The result is trivially true in this case. The values of the remaining global access not shown in FIG. 4 are computed similarly. The assertion violation corresponds to the path condition φ of the ERR node (also called the error condition), which evaluates to $r_4 \neq 3$. Finally, a partial order $<_{GS}$ denoting the relative order of events is also computed:

$$<_{GS}=\{(W1,R1),(W1,R1'),(R1,R2),(R1,R3),(R2,W2),\\(W2<R4),\ldots\}.$$

Note that IS abstracts away all the thread-local control and data flow from the CCFG and only contains the global access information.

In the interference skeleton computed above, the values of the global read accesses are unconstrained symbolic variables. The composition step 205 constrains these values by relating them to the global write accesses in the same or the other threads. However, these constraints cannot be enforced arbitrarily, e.g., the read access R2 cannot obtain its value from a write access W2 that follows R2 in the program order. In general, both the control and data now impose restrictions on the set of write accesses that a read access can copy. Therefore, in order to avoid infeasible executions during this composition, sequential consistency constraints are added between the read and write accesses. As described in detail below, the SC constraints enforce that each read access R must copy some write access W such that both access the same memory location, the value written by W is the value read by R, and W must-happen-before R in the execution order. SC constraints may be added in an optimized way to handle programs performing indirect accesses via pointers and arrays. In addition, the error condition $\phi=(r_4 \neq 3)$ is checked for feasibility, together with the above IS constraints by an off-the-shelf SMT solver.

Constructing a memory model allows one to convert an arbitrary concurrent C program to a simplified intermediate program. One advantageous characteristic of this transformation is that it employs a scalable pointer analysis to partition memory into non-aliasing segments. The simplified program may then be converted into a CCFG.

In order to handle complex C program constructs like pointers, arrays and structures uniformly, a memory model is imposed on the given program in a manner similar to the HAVOC tool. Indirect memory accesses are handled using a memory map Mem, which models the program heap by mapping a memory location (address) to a symbolic value. All variables and objects whose address can be taken are allocated on the heap. The address of a variable v is a fixed value denoted by &v. Let offs(f) denote the integer offset of a location of the field f inside its enclosing structure. Using the above map, the program statements (denoted by operator $\mathcal{T}$) can be transformed as follows: (i) $\mathcal{T}$ (e→f)=Mem[ $\mathcal{T}$ (e)+offs (f)], (ii) $\mathcal{T}$ (*e)Mem[ $\mathcal{T}$ (e)], (iii) $\mathcal{T}$ (&e→f)= $\mathcal{T}$ (e)+offs(f), (iv) $\mathcal{T}$ (e[i])=Mem[ $\mathcal{T}$ (e)+i*stride(e), where stride(e)

denotes the size of array e's type. All C program statements with indirect, accesses can be transformed using the above rules.

The above modeling is based on a single memory map Mem and does not allow sealable analysis, as all the aliasing conflicts of the program statements are captured by the same map Mem. To enable scalable analysis, the previous approaches partition the single map into multiple disjoint maps assuming that the program is type-safe or fieldsafe. For example, if the program is type-safe, then each type $\mathcal{T}$ is allocated a unique map, since no aliasing conflicts may arise between these maps. However, the lack of type- or field-safety in programs makes the above memory models and the subsequent analysis imprecise. Therefore, a memory partitioning scheme may be used that does not rely on the above forms of safety.

Figure 5:
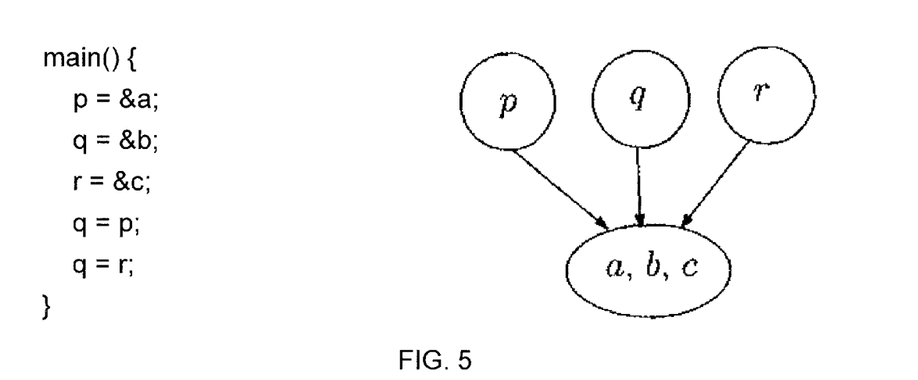
FIG. 5 shows a simple program with its points-to graph.

The present principles partition memory by computing aliasing relationships among variables in the program, such that the set of variables that may alias with each other. These relationships are computed using a scalable pointer analysis approach, extended to handle thread creation. This approach constructs a points-to graph by analyzing the program statements flow- and context-insensitively. Each node v in the graph represents a set of memory locations and an edge e: $v_1 \rightarrow v_2$ in the graph denotes that a location in $v_1$ points to some location in the set $v_2$. FIG. 5 shows a simple program with its points-to graph. An assignment of form q=p results in merging or unification of nodes that q and p point to, into a single node. This approach partitions (referred to as a Steensgaard partition) the set of all program pointers into disjoint subsets that respect the aliasing relation: each node represents an equivalence class of pointers which can only be aliased to pointers in the same equivalence class. Moreover, because an ordering relation among the classes in a partition is induced, the above graph is always acyclic. Locations corresponding to any cycle in the program heap are absorbed into a single node in the graph.

The above properties of a Steensgaard partition allow one to obtain a memory partition directly. This includes creating a unique memory map $Mem_v$ for each class/node v in the partition and modeling all the accesses of the memory locations in v as accesses to $Mem_v$. The resultant memory map set is referred to as the Steensgaard map set. Note that, because the points-to graph does not have any cycles, there is no circular dependency among these memory maps. Steensgaard partitions can advantageously be employed for scalable memory modeling during program verification.

In concurrent programs with pointers, it is non-trivial to detect the set of variables that can be accessed by multiple threads. The above partitions conservatively estimate this set. All the variables that are declared as globals in the program or belong to an equivalence class containing at least one globally declared variable are said to be shared. The predicate shared (x) for a variable x denotes that x is shared. For ease of description in this paper, the following memory partition is used: a single map MemG, called the shared memory map, is used to denote the map containing the shared variables and maps $MemL_k$—the local memory map for thread k. The domains of MemG and $MemL_k$ maps are disjoint from each other, thus creating a valid partition. Any access to the shared map is referred to as a global access. Note that, in practice, each of these maps could be further partitioned as given by the Steensgaard map set. Having a fine-grained memory partition reduces the map conflicts during the analysis, allowing the analysis to scale better.

All accesses in the program statements are rewritten in terms of the above partition. For example, a statement of form "l=(*p);" where l and p are local and shared variables respectively, is re-written as "l=MemG [p];". As a result, all global accesses in the program can be identified syntactically. Non-shared variables whose addresses are not taken in the program are referred to by their names, as before. Moreover, the program statements are rewritten so that no statement may perform more than one global read or write access. In other words, no statement may contain more than one occurrence of MemG. For example, a statement x=(*p); where both p and x are shared variables, is rewritten as lp=MemG [&p]; ap=MemG [lp]; MemG [&x]=ap; where lp and ap are local variables of appropriate types.

A CCFG is an extension of the ordinary sequential control flow graphs (CFGs) to concurrent programs. The edges contain both assignments and guards. Special atomic edges are used to model mutexes and conditions. A CCFG contains two special nodes, named fork and join corresponding to thread creation and join points. The assertions in the original program are converted into monitoring error blocks while constructing the CCFG. Therefore, assertion checking reduces to checking if there exists a feasible path in the CCFG that terminates at the error block.

For sake of convenience, consider one parallel region, e.g., the sub-graph including a fork and the corresponding join node. This sub-graph can be further decomposed into individual CFGs corresponding to each thread. Such CFGs are referred to as thread CFGs. Analyzing concurrent programs with recursion or unbounded number of threads is undecidable. Instead, a finitization of the concurrent program is used.

Loops and recursive functions are unrolled to a finite depth. Any forks inside loops are also duplicated for a fixed number of times. As a result, the CCFG is a directed acyclic graph. These bounded CCFGs may then be analyzed for assertion violations. Bounded CCFGs include two kinds of approximations: (i) bounding loops and recursion intra-thread, and (ii) bounding the number of possible threads. The first one is an under-approximation: no found violations will be spurious. However, the second form of approximation leads to unsoundness: omitting threads may lead to spurious violations during analysis. This analysis is complete relative to the unrolled CCFG. Note that, although the analysis is restricted to a bounded CCFG, the representation is nonetheless expressive since it allows specification of thread creation and destruction and the relative order between threads. For ease of presentation, it can be assumed that all functions are inlined at call locations; however, this approach can be extended directly to standard forward inter-procedural style analysis, which analyzes each function under all possible calling contexts.

The data-flow analysis technique used to summarize the CCFG obtained above explores the CCFG while propagating the symbolic data in a thread modular manner. It works directly on the CCFG and does not require a de-composition of CCFG into sub-graphs corresponding to individual threads. The result of summarization is an interference skeleton as defined below.

Figure 6:
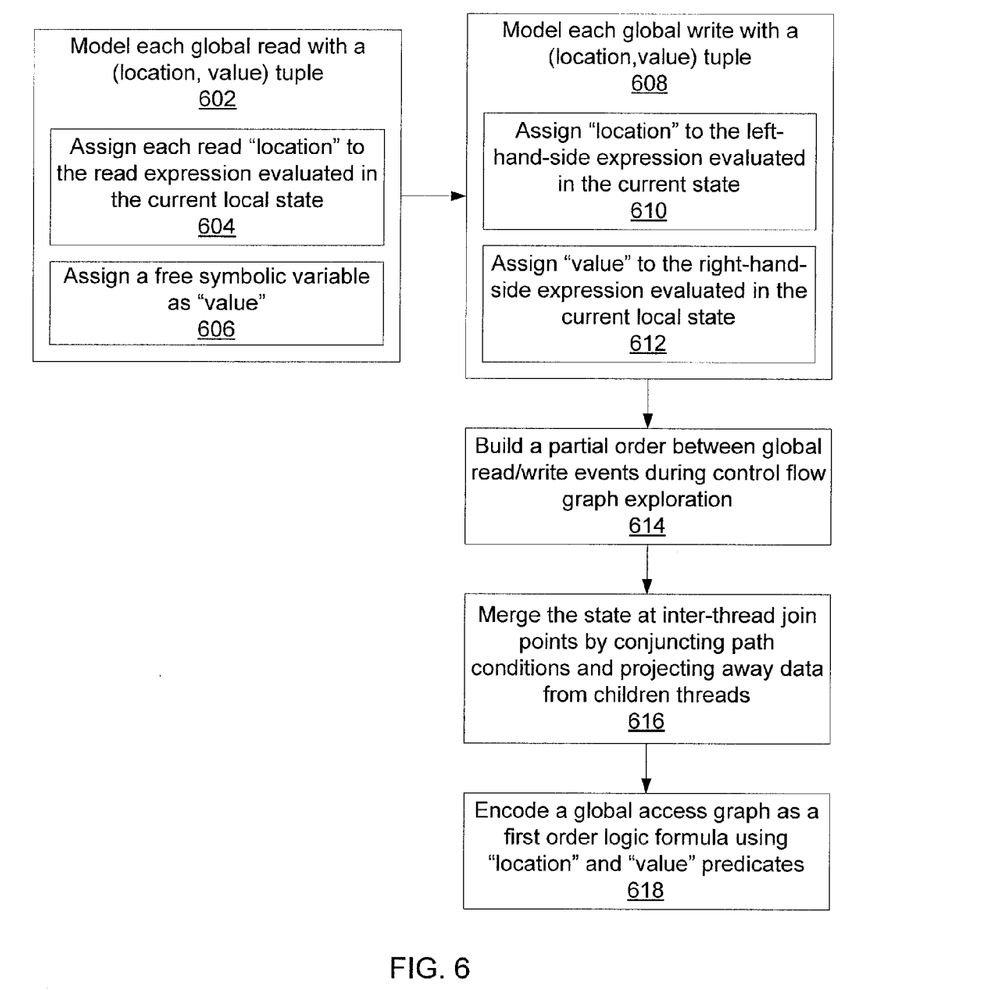
FIG. 6 is a block/flow diagram of a method/system for summarizing a concurrent program into a symbolic interference skeleton using data-flow analysis.

Referring now to FIG. 6, a block/flow diagram that provides greater detail on block 202 of FIG. 2 is shown. The analysis described herein summarizes the concurrent program into a symbolic IS using data-flow analysis. Block 602 models each global read in a program with a (loc,val) tuple. Block 604 assigns the "location" of the tuple to the read expression evaluated in the current local state and block 606 assigns the "value" of the type as a free symbolic variable. Block 608 then models each global write in the program with another (loc,val) tuple. Global writes come in the form left-hand-side=right-hand-side (lhs=rhs). The "location" of the write tuple is assigned to the left-hand-side expression evaluated in the current state at block 610 and the "value" of the write tuple is assigned to the right-hand-side expression evaluated in the local state at block 612. Block 614 builds a partial order $\prec_S$ between the global read and write events during control flow graph exploration. Block 616 merges the state at inter-thread join points by conjuncting path conditions and projecting away data from children threads (i.e., discarding the data from children threads). Block 618 encodes a global access graph as a first order logic formula using the "location" and "value" predicates.

An interference skeleton (IS) includes (i) a set S of global accesses and (ii) a partial order $\prec_S$ between the global accesses. Each global access consists of a pair (loc,val) denoting the shared memory location accessed and the value read/written respectively, and the Occ(e) which is the necessary condition for e to occur. The local data-flow is summarized in terms of the (loc,val) tuples of global accesses.

To obtain scalability and ensure termination, most conventional data-flow analysis use a less expressive domain than terms (e.g., polyhedral) and perform an imprecise join operation at join nodes (nodes with multiple predecessors). In contrast, the present data-flow analysis uses program expressions to represent data precisely. Moreover, a precise merge of data facts at join nodes retains the path-sensitive information. However, due to the finite unrolling, only a subset of all feasible paths through the actual program are considered. As a result, the present analysis is exact for the set of paths considered, but only analyzes a finitized CCFG to ensure termination.

Conventional symbolic execution for sequential programs initializes globals and function arguments to symbolic free variables, and represents the rest of the data facts in terms of the initial free variables. For analyzing concurrent programs, this is not sufficient since a global read access in a thread may depend on a previous global write access in the same thread or in a parallel thread. Propagating all writes to the read locations during data flow analysis amounts to considering all interleavings of the threads and is prohibitively expensive. Therefore a thread modular approach may be used for data-flow analysis based on the idea of interference abstraction. Each global read access is assigned a fresh symbolic value, which is then propagated thread-locally. All the global writes are computed in terms of these symbolic global read accesses. The analysis, therefore, dissociates the global reads in one thread from global writes in another, allowing an analysis of each thread independently to obtain a compact summary that involves only global read and write values. These isolated reads are later associated to appropriate writes during composition step.

Recall that all statements in the CCFG have expressions involving either the shared map MemG, or one of the local maps MemL, or non-shared variables whose address is not taken in the program, and no statement accesses MemG more than once. Assignment statements of form l:=r, where l (r) accesses MemG is said to be a global write (read) access. Also, the guard conditions do not make any global read accesses. The analysis maintains and propagates data symbolically in the following form.

The analysis propagates a data tuple of form $\langle \Psi, \text{MemL}, E, \text{Tid} \rangle$ where $\Psi$ the path condition, MemL is the local memory map for the thread corresponding to the current location, Tid denotes the thread identifier of the current thread and E denotes the set of intra-thread global read/write accesses which may occur immediately preceding the current location. The above data tuple is referred to as the symbolic state s, and its components as s.$\Psi$, s.E, etc. Note that global read and writes are not propagated during CCFG exploration. Instead, all the global accesses are captured as events in IS.

Given a fragment F of the CCFG (for example, a function) having unique entry and exit nodes, the thread-modular summary of F includes (i) an interference skeleton IS=(S, $\prec_S$) over global accesses S in F, and (ii) a symbolic state $\langle \Psi, \text{MemL}, E \rangle$ at the exit node of F, where $\Psi$, L, and E denote the path condition, local map, and the reaching accesses at the exit node, in terms of the input state map at the entry of F. Note that in the case where the fragment F (e.g., a function body) contains no global accesses, the function summary reduces to the traditional sequential function summary of form $\langle \Psi, \text{MemL} \rangle$, which represents the function outputs in terms of its inputs. For ease of presentation the analysis is first described assuming that all function calls are inlined in the CCFG. Subsequently, general inter-procedural summarization is discussed.

The analysis computes 202 an interference skeleton IS=(S, $\prec_S$), where S includes the set of global accesses and $\prec_S$ denotes a partial order on elements of S. Each access e in S contains the corresponding location and value terms, loc(e) and val(e) 604, and occurring condition Occ(e). The values represented by loc(e) correspond to memory locations in MemG.

The present analysis assumes that all memory locations may have arbitrary initial values before program execution. This is modeled in a lazy manner as follows. To initialize the global map MemG, add an initial write access $W_0$ to the set S in IS such that loc($W_0$)=g and val($W_0$)=V(g), where g is a fresh symbolic variable denoting an arbitrary location and V is an un-interpreted function. Set E={$W_0$} for the start node in the CCFG to ensure that $W_0$ precedes all the accesses $\prec_S$. Each local memory map is initialized to a symbolic value, e.g., MemL$_0$ for map MemL. An initial access to a local variable at location l is denoted by MemL$_0$[l]. The initialization of global and local memory maps are different since it is necessary to maintain (loc,val) pairs explicitly for the global accesses only and not for the local ones. The initial path condition $\Psi$ is set to true.

Form lhs:=rhs. Either lhs, or rhs makes a global access, called a global write or read respectively. First suppose that there is no global access in lhs, or rhs. The analysis evaluates the lhs and rhs expressions in the current local map MemL to obtain, for example, location and value terms l and v respectively. All memory accesses are evaluated using the select predicate. Then MemL is updated such that the new value MemL'=store(MemL,l,v).

Next, suppose that rhs performs a global read and that rhs is of form MemG[e]. First, the expression e is evaluated in MemL to obtain, say l. The analysis then creates a global read access (block 602 above), say R, with loc(R)=l (604 above) and val(R)=$R_l$ (606 above), where $R_l$ is a fresh symbolic variable. The occurrence condition for R, Occ(R) is set to the current path condition $\Psi$. The map MemL is then updated using value $R_l$ as above. For each e∈E, the analysis adds (e, R) to $\prec_S$ and sets E=

Next suppose that lhs performs a global write of form MemG[e]:=e'. Again, e and e' are evaluated in MemL to obtain, for example, a symbolic value l and v respectively. A new global write access W is added to IS with loc(W)=l,val (W)=v, and Occ(W)=$\Psi$ (block 608 above). For each e∈E the analysis adds (e, W) to $\prec_S$ (block 614 above) and sets E={W}. A guard e is first evaluated in MemL to obtain $\Psi_e$. The path condition $\Psi$ is updated to $\Psi \wedge \Psi_e$.

Indirect accesses are modeled via pointers in a uniform manner by employing a precise memory representation using maps MemG and MemL. Note that, by using select and store operators for manipulating symbolic data, arbitrary indirect memory accesses to MemL can be handled via pointers or arrays in an implicit manner, without explicitly computing the alias sets of these pointers. Indirect memory accesses to the shared map MemG are captured by the location expression loc(e) for each global access e. The subsequent composition stage employs loc(e) to check for interfering accesses.

The map s.MemL for the child thread is initialized. The s.Tid variable to the thread identifier of the thread into which the data is propagated. The path condition and last event set s.E are propagated to the successor locations in all the threads. One may distinguish between joins that happen inside the control flow of a thread (intra-thread join) from joins that correspond to a thread termination location (interthread joins).

Intra-thread joins are handled similar to precise joins in sequential programs. Incoming local memory maps are merged using an if-then-else operator. The incoming sets of preceding accesses (E) are also merged. For example, if the incoming states are ($\Psi$,MemL,E,tid) and ($\Psi'$,MemL',E',tid), then the result of join is ($\Psi \vee \Psi'$,ite($\Psi$,MemL, MemL')E∪E, tid).

At inter-thread joins (block 616), all threads except the parent thread stop execution. As a result, the local memory map propagates forward corresponding to the parent thread only and the Tid to that of the parent thread is set. The set of last events are merged are propagated as above. The path conditions from incoming states are conjuncted to model the fact that all threads must reach the join location simultaneously.

Note that although data-flow analysis works on the complete CCFG, the analysis is thread-modular, wherein each constituent thread is analyzed independently. All interference from other concurrent threads is abstracted using symbolic unknowns.

The above technique can summarize arbitrary (bounded) concurrent programs, assuming that functions are inlined. However, inlining causes blow up of the analyzed program and makes it difficult to exploit the modular sequential program structure. The technique can be extended to perform a standard interprocedural analysis based on computing summaries at function boundaries and reusing these summaries at the calling contexts. A function summary includes an interface skeleton together with the local symbolic state MemL at the exit node of the function. Here, the exit state MemL is computed using a fresh symbolic input state $MemL_i$ at the function input. In contrast to explicit summarization approaches which depend on detecting transaction boundaries, symbolic summaries can be computed for arbitrary program regions across multiple transactions. One consideration is how to reuse pre-computed summaries: given a calling context state MemL', the interference skeleton of the summary is duplicated and all global accesses evaluated in the incoming state MemL' by substituting MemL' for $MemL_i$.

The analysis also computes the set of error conditions EC, which contains the computed path conditions for error nodes. In order to check if an error location is reachable, the feasibility of the error conditions is checked using an SMT solver. Note that these conditions are expressed in terms of global reads, which are free symbolic variables. Therefore, they must be constrained by relating them to the corresponding global write values. The next step achieves this goal by collapsing the partial order computed above.

The present principles handle assignments and guards in a lazy manner, which leads to local memory map (MemL) values being represented as terms with nested select and store operators. Since these terms burden the SMT solver during the checking phase, the transformers are computed in an optimized manner to avoid such terms. This optimization exploits the fact that the memory addresses of most local variables are not taken. Therefore, there are no aliasing conflicts due to these variables and they need not be included in the local memory map. So, the analysis maintains a separate map a which explicitly maps each variable to its symbolic value. The map σ is used for lookup and is updated in a manner similar to MemL. A simplified symbolic term value is tried to check if it corresponds to a unique result, e.g., select (@a,store(@b,1,store(@a,0,$MemL_0$))) evaluates to 0. In many cases, this simplification leads to simpler values for memory locations being written to and improves the run time of the SMT solver. The interference skeleton IS=(S,$\prec_S$) is a precise thread-modular summary of the finite CCFG. Moreover, $\prec_S$ respects the program order.

A linearization of the interference skeleton IS=(S,$\prec_S$) computed above, is a tuple (S', $<_{S'}$) where (i) S'⊆S, (ii)$<_S$ is a total order, and (iii) for all $rw_1$, $rw_2 \in$S',$rw_1 \prec_S rw_2 \Rightarrow rw_1 <_S rw_2$. In other words, a linearization of IS is obtained by selecting a subset of accesses from IS and imposing a total order between them such that the total order respects the partial order in IS. $<_S$ is also referred to as a sequence.

A linearization is said to be program path-consistent if its projection on to CCFG corresponds to actual CCFG paths (without missing any accesses on the path). A linearization IS is said to be feasible if there exists a concrete interleaved execution of the program corresponding to IS. Each interleaved execution trace of the bounded CCFG corresponds to a linearization of the interference skeleton IS.

Take, for example, an interference skeleton IS computed by the data flow analysis above. The skeleton contains the location and values of read and write accesses in the bounded CCFG obtained from the program as well as their relative ordering. Although each program execution trace corresponds to a linearization GS' of IS, the converse does not hold. In other words, not all linearizations will be feasible program traces. This is because the value of read accesses in GS' corresponds to free variables which are not constrained by the values of any preceding write access. This leads to infeasible linearizations. In other words, a read access does not know which write access to copy to simulate a concrete program trace. In order to characterize the set of feasible linearizations of IS, the copy relation is defined.

Let r and w be a read and write to the same location in a read/write sequence S. It can be said that r copies w, or copy(r,w) holds, if (a) the value read by r is same as value written by w, and, (b) there are no interfering write accesses w' to 1 in S, such that r$<_S$ w' and w'$<_S$ w. A linearization GS'=(S,$<_S$) is said to be sequentially consistent if the following axioms hold.

For a "program order" axiom, let $rw_1$ and $rw_2$ be read/write accesses to the same location 1 in the sequence S. If $rw_1$ follows $rw_2$ in the execution order of program P, i.e., $rw_1 \prec_P rw_2$ then $rw_1 <_S rw_2$. For a "copy some" axiom, each read action to location 1 in S must copy some write action in S to location l. The initial value of location l is also represented by a rite access with a non-deterministic value. A linearization GS' of GS is feasible if and only if it is sequentially consistent. Note that any linearization of the interference skeleton IS will obey the program order. However, additional constraints are imposed on a linearization to satisfy "copy some." Such constraints are referred to as "copy constraints."

The copy constraints, denoted by $\Phi_C$, include three kinds of constraints:

$$\Phi_C^1 = \forall r, \exists w. \text{copy}(r,w)$$

$$\Phi_C^2 = \forall r, w. \text{copy}(r,w) \Rightarrow \text{Occ}(w) \wedge (\text{val}(r) = \text{val}(w))$$
$$\wedge (\text{loc}(r) = \text{loc}(w)) \wedge HB(w,r)$$

$$\Phi_C^3 = \forall r, w. \text{copy}(r,w) \Rightarrow (\forall (w' \neq w) \neg, \text{Occ}(w') \vee (\text{HBet}(w,w',r) \Rightarrow ((\text{loc}(w) \neq \text{loc}(w'))))$$

$$\Phi_C = \Phi_C^1 \wedge \Phi_C^2 \wedge \Phi_C^3,$$

In the above encoding, the predicate $HB(e_1, e_2)$ is used to denote that access $e_1$ must happen before access $e_2$. In other words, all executions containing $e_2$ must contain a preceding $e_1$ access. More details on the encoding of HB are presented below. The predicates loc and val denote the location and the value of the read and write accesses respectively. The constraints $\Phi^1_C$ capture the conditions of the "copy some" axiom, i.e., each read access must copy some write access. The other two formulae capture the conditions associated with a copy action. The formula I captures data-now conditions on the copy, i.e. the write access must occur, the values/locations of both accesses should be the same and the write access must happen before the read access in the linearization. The formula t captures the fact that no interfering write access w' may happen between the write access w and a read access r copying from w. The predicate HBet(w,w',r), denoting that w' must-happen-between w and r, is formally equivalent to (HB(w,w') ∧ HB(w',r)).

The set of sequentially consistent linearizations of an interference skeleton IS may be encoded as a formula in first-order logic (block 618 above). Such a formula can serve as input to a decision procedure, e.g., an SMT solver, for checking feasible linearizations. The encoding consists of two parts. First, encode the skeleton IS as a formula $\Phi_{GS}$. Then encode the copy constraints $\Phi_C$. The set of feasible linearizations of IS is then represented as a formula $\Phi = \Phi_{GS} \wedge \Phi_C$. An SMT solver, can be used to instantiate the feasible linearizations of $\Phi$.

Data-flow constraints are encoded in a straightforward manner. For each read/write access, create two variables loc_e and val_e and impose the respective constraints. Finally, the partial order $\prec_S$ is captured by the happens-before predicate, HB. For $\Phi_C$, the quantified constraints discussed above are instantiated explicitly for all possible read and write accesses in IS. The "occurs" predicate Occ(w) for write access w is replaced by the corresponding path condition. Note that this explicit instantiation may result in a formula that is cubic in size of the read/write access set.

Both $\Phi_{GS}$ and $\Phi_C$ depend on the must-happen-before relation, HB between read/write accesses. The "happens-before" relation is a partial order relation and can be directly encoded as an uninterpreted relation together with anti-symmetry and transitivity axioms. However, this encoding would be extremely inefficient and cause blowup in the formula size. To obtain an efficient encoding, the relation is encoded using the integer theory with the corresponding partial order operator <. More precisely, an integer clock variable $T_e$ is assigned to each access e. Now, $HB(e_1,e_2)$ is simply encoded as $T_{e_1} < T_{e_2}$. Given the path condition $\Psi$ corresponding to an error location, we can check if the error location is reachable by checking the formula $\Phi \wedge \Psi$ using an SMT solver.

Eager instantiation of the copy constraints $\Phi_C$ for all pairs of reads and writes in large programs proves to be a significant burden on the SMT solver during satisfiability check. Moreover, in case of indirect accesses, it is not clear upfront if a read r cannot interfere with a write w, i.e., (loc(r)=loc(w)) is unsatisfiable, thus making the search more complex. However, many of these copy constraints may be redundant, i.e., $\neg$ copy(r,w) holds. For example, note that the constraints corresponding to $\Phi_C^2$ may reduce to $\neg$ copy(r,w) if the right hand side (RHS) of the formula is unsatisfiable for some r and w. This may happen due to a number of reasons. For example, a read r cannot copy a write w that follows r in the program (R2, W2 in FIG. 3), or a read r in a child thread cannot copy a write w that occurs in the parent thread after the child thread terminates. Also, r can only copy from w if r and w may interfere, i.e., (loc(r)=loc(w)) is satisfiable. In other words, each read may copy from only a restricted set of writes, and it is wasteful to add copy constraints for the writes not in the set. A large number of these redundant constraints can be detected statically by analyzing the interference skeleton IS and removed to optimize the composition. A systematic method to prune these copy constraints is described below.

Given an interference skeleton IS=(S, $\prec_S$), $\prec_S^*$ denotes the transitive closure of $\prec_S$. Two accesses $e_1$ and $e_2$ may-happen-in-parallel, i.e., $MHP(e_1, e_2)$, if both $e_1 \prec_S^* e_2$ and $e_2 \prec_S^* e_1$ do not hold. If a write w follows another write w' in the same thread, and w interferes with w' (i.e., (loc(r)=loc(w))) in all program executions, then it can be said that w kills w'. More formally, the set of writes killed by w is given by Kill(w) ={w'|w' $\prec_S^*$ w ∧ loc(w')⇒ loc(w)}. Note that for symbolic values loc(w) and loc(w'), loc(w')⇒ loc(w) must hold if w kills w' in all executions.

It can be said that a write w may reach a read r, if (i) MHP(r,w), or (ii) w happens before r and for all w' $\prec_S^*$ r·(w'≠w), w∉Kill (w') holds. The set of writes that may reach r is denoted by $\hbar(r)$. $\hbar(r)$ is computed for each read r as follows. First, compute the transitive closure $\prec_S^*$ for the given skeleton IS. Computing (i) MHP(r,w) requires checking if both (r,w) or (w,r) do not belong to $\prec_S^*$. In order to compute the writes that are not killed, perform a light-weight Gen-Kill analysis of the partial order graph for $\prec_S$. Starting from the node corresponding to the initial write, the analysis computes and propagates the set of reaching writes to each location in the graph (i.e., for each access in IS): each location that generates a write w may kill the incoming writes w' that belong to Kill(w). Note that checking loc(w')⇒ loc(w) precisely is expensive if both loc(w) and loc(w') are symbolic values. Therefore the kill set may be estimated conservatively by checking if loc(w) and loc(w') are exactly the same.

In order to prune the redundant constraints in $\Phi_C$, the may-copy set C(r) is defined for each r by restricting Π(r) to interfering writes w that can occur, i.e., C(r)={w|w∈Π(r) ∧ (loc(r)=loc(w))∧ occ(w)}. Again, computing C(r) precisely is expensive: syntactically checking if occ(w) or (loc(r)=loc(w)) is unsatisfiable. Finally, $\Phi_C^1$, $\Phi_C^2$ and $\Phi_C^3$ are instantiated only for pairs r and w, where w∈C(r).

Instantiating the inner quantifier $\Phi_C^3$ for all possible writes w' may still produce redundant constraints. We prune such constraints by checking if (a) the write w' cannot occur ($\neg$ occ(w')), or (b) cannot happen between w and r, ($\neg$ HBet(w,w',r)), or (c) loc(w')=loc(w) is unsatisfiable. (a) and (c) are checked syntactically. (b) is checked using the $\prec_{IS}^*$ relation computed above, i.e., w' cannot happen between w and r if either w $\prec_{IS}^*$ or r $\prec_{IS}^*$ w'. The encoding can be further optimized to handle atomic regions and to perform a context-bounded analysis.

Having described preferred embodiments of a system and method for precise thread-modular summarization of concurrent programs (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for concurrent program verification comprising:
summarizing a concurrent program into a symbolic interference skeleton (IS) using data flow analysis;
enforcing sequential consistency constraints on read and write events in the symbolic IS; and
checking error conditions together with the symbolic IS using a processor, wherein summarizing the concurrent program includes modeling each global read in the concurrent program with a read (location, value, occ) tuple and modeling each global write in the concurrent program with a write (location, value, occ) tuple.

2. The method of claim 1, wherein modeling each global read comprises:
assigning the "location" component of each read (location, value, occ) tuple to a read expression evaluated in a current state;
assigning the "value" component of each read (location, value, occ) tuple to a free symbolic value; and
assigning the "occ" component of each read (location, value, occ) tuple to a path condition of the current state.

3. The method of claim 1, wherein modeling each global write comprises:
assigning the "location" component of each write (location, value, occ) tuple to a left-hand-side expression evaluated in a current state;
assigning the "value" component of each write (location, value, occ) tuple to a right-hand-side expression evaluated in the current state; and
assigning the "occ" component of each write (location, value, occ) tuple to a path condition of the current state.

4. The method of claim 1, wherein summarizing the concurrent program comprises building a partial order between global reads and global writes.

5. The method of claim 1, wherein summarizing the concurrent program comprises merging at inter-thread join points by conjoining path conditions of incoming states and projecting away data from children threads.

6. The method of claim 1, wherein summarizing the concurrent program comprises merging at intra-thread join points by disjoining path conditions of incoming states.

7. The method of claim 1, wherein enforcing sequential consistency constraints comprises:
symbolically composing the symbolic IS; and
systematically optimizing the symbolic composition.

8. The method of claim 7, wherein symbolically composing the symbolic IS includes instantiating sequential consistency axioms for reads and writes in the symbolic IS.

9. The method of claim 7, wherein systematically optimizing the symbolic composition includes:
pruning copy constraints using information available from the symbolic IS; and
statically analyzing the concurrent program.

10. The method of claim 1, wherein checking error conditions includes passing a first order logic formula encoding of the symbolic IS to a satisfiability-modulo-theory (SMT) solver.

11. A non-transitory computer readable storage medium storing a computer readable program for concurrent program verification comprising:
a program verifier configured to accept a concurrent application and determine whether the concurrent application includes concurrency errors, wherein the program verifier comprises:
a program analysis module configured to summarize the concurrent application into a symbolic interference skeleton (IS) using data flow analysis;
a constraint enforcement module configured to enforce sequential consistency constraints on read and write events in the symbolic IS; and
a solver module configured to check error conditions together with the symbolic IS, wherein the program analysis module is further configured to model each global read in the concurrent application with a read (location, value, occ) tuple and model each global write in the concurrent application with a write (location, value, occ) tuple.

12. The non-transitory computer readable storage medium of claim 11, wherein the program analysis module is further configured to model global reads by assigning the "location" component of each read (location, value, occ) tuple to a read expression evaluated in a current state, assigning the "value" component of each read (location, value, occ) tuple to a free symbolic value, and assigning the "occ" component of each read (location, value, occ) tuple to a path condition of the current state.

13. The non-transitory computer readable storage medium of claim 11, wherein the program analysis module is further configured to model global writes by assigning the "location" component of each write (location, value, occ) tuple to a left-hand-side expression evaluated in a current state, assigning the "value" component of each write (location, value, occ) tuple to a right-hand-side expression evaluated in the current state, and assigning the "occ" component of each write (location, value, occ) tuple to a path condition of the current state.

14. The non-transitory computer readable storage medium of claim 11, wherein the program analysis module is further configured to build a partial order between global reads and global writes.

15. The non-transitory computer readable storage medium of claim 11, wherein the program analysis module is further configured to encode the symbolic IS as a first order logic formula using the "location," "value" and " " "occ" predicates.

16. The non-transitory computer readable storage medium of claim 11, wherein the constraint enforcement module is further configured to symbolically compose the symbolic IS and systematically optimize the symbolic composition.

17. The non-transitory computer readable storage medium of claim 16, wherein the constraint enforcement module is further configured to systematically optimize the symbolic composition by pruning copy constraints using information available from statically analyzing the symbolic IS.

18. A method for concurrent program verification comprising:
summarizing a concurrent program into a symbolic interference skeleton (IS) using data flow analysis;
enforcing sequential consistency constraints on read and write events in the symbolic IS; and
checking error conditions together with the symbolic IS using a processor, wherein summarizing the concurrent program includes encoding the symbolic IS as a first order logic formula using the "location," "occ," and "value" predicates.

* * * * *